United States Patent
Watarai et al.

[11] Patent Number: 6,030,052
[45] Date of Patent: Feb. 29, 2000

[54] BICYCLE HUB SHELL WITH REMOVABLE FLANGES

[75] Inventors: Etsuyoshi Watarai, Izumi; Takuji Masui, Sakai, both of Japan

[73] Assignee: Shimano, Inc., Osaka, Japan

[21] Appl. No.: 08/998,186

[22] Filed: Dec. 24, 1997

[30] Foreign Application Priority Data

Jan. 10, 1997 [JP] Japan ................................ 9-002571

[51] Int. Cl.$^7$ .................................................... B60B 27/00
[52] U.S. Cl. ........................ 301/110.5; 301/59; 301/124.2
[58] Field of Search .................... 301/110.5, 59, 301/55, 124.2, 110.6, 60, 61

[56] References Cited

U.S. PATENT DOCUMENTS

| | | | |
|---|---|---|---|
| 1,223,140 | 4/1917 | Boudreaux | 301/55 |
| 1,515,940 | 11/1924 | Edwards | 301/59 |
| 2,246,492 | 6/1941 | Aldridge | 301/110.5 |
| 2,290,451 | 7/1942 | Schwinn | 301/110.5 |
| 3,873,162 | 3/1975 | Segawa | 301/110.5 |
| 4,844,552 | 7/1989 | Tsygankov et al. | 301/110.5 |
| 5,622,412 | 4/1997 | Yamane | 301/110.5 |
| 5,653,512 | 8/1997 | Phillips | 301/110.5 |
| 5,676,227 | 10/1997 | Hugi | 301/110.5 |
| 5,829,844 | 11/1998 | Slankard et al. | 301/110.5 |

FOREIGN PATENT DOCUMENTS

| | | | |
|---|---|---|---|
| 557936 | 8/1923 | France | 301/110.5 |
| 658291 | 6/1929 | France | 301/110.5 |
| 1418678 | of 1965 | France . | |
| 607040 | 12/1934 | Germany | 301/110.5 |
| 46-4052 | of 1971 | Japan . | |
| 15504 | of 1897 | United Kingdom | 301/110.5 |
| 292317 | 6/1928 | United Kingdom | 301/110.5 |
| 308907 | 4/1929 | United Kingdom | 301/110.5 |
| 573423 | 11/1945 | United Kingdom | 301/110.5 |
| 2206549 | 1/1989 | United Kingdom | 301/110.5 |

*Primary Examiner*—S. Joseph Morano
*Assistant Examiner*—Long Bao Nguyen
*Attorney, Agent, or Firm*—James A. Deland

[57] ABSTRACT

A bicycle hub includes an annular hub shell; a first flange; a second flange; and a fixing mechanism formed separately from the hub shell, the first flange and the second flange for axially fixing the first flange and the second flange to the hub shell. Either of the flanges may be installed and removed from the hub shell as desired.

39 Claims, 5 Drawing Sheets

BICYCLE HUB SHELL WITH REMOVABLE FLANGES

BACKGROUND OF THE INVENTION

The present invention is directed to bicycle wheel hubs and, more particularly, to a bicycle wheel hub with removable flanges.

Bicycle wheels usually have a hub, spokes that are hooked onto the hub and arranged in more or less radial fashion, a rim that is supported by the spokes, and a tire that is mounted on the rim. The hub has a hub axle that is non-rotatably fixed to a frame and a hub shell that is rotatably supported by the hub axle. This hub shell usually has a cylindrical hub unit and a pair of annular flange members that are fixed at either end of the hub unit. Spoke holes are formed at equidistant intervals in the peripheral direction in the flange members in a number corresponding to the number of spokes. Holes are also formed in the rim in a number corresponding to the number of spokes. With this type of wheel, the number of spokes linking the rim and the hub is selected according to the preference of the user, the intended application of the wheel, and so on. For example, wheels with 12, 20, 24, 28, 32, 36, 40, and 48 spokes have been used in the past. Conventionally, separate hubs and rims are manufactured to accommodate the desired number of spokes, even for wheels having the same size.

Because of the customized nature of the hubs and rims used for different numbers of spokes, a separate hub and rim must be purchased if the rider decides to change the number of spokes on the wheel. For instance, when the wheels of a bicycle used for cross-country racing are to be changed to downhill racing wheels, the hub will have to be replaced if the new wheels have a different number of spokes. Furthermore, if the spoke holes in the spoke flanges are damaged, the entire hub has to be replaced even if the other portions are still usable. This creates a financial burden on the rider, thus making is difficult for the rider to accommodate different riding situations.

SUMMARY OF THE INVENTION

The present invention is directed to a bicycle hub having removable flanges so that the entire hub does not have to be replaced if there is damage to the hub flange or if the rider decides to change the flange. The flanges may be used to support spokes that connect the hub to the wheel rim, or the present invention may be applied to any wheel such as disk wheels or tension disks.

In one embodiment of the present invention, a bicycle hub includes a hub shell having a threaded outer peripheral surface, a flange, and a threaded fixing member for engaging the threaded outer peripheral surface of the hub shell and for fixing the flange to the hub shell. The flange may be installed and removed merely by unscrewing the fixing member. In a more general embodiment of the present invention that provides maximum flexibility, a bicycle hub includes a hub shell; a first flange; a second flange; and a fixing mechanism formed separately from the hub shell, the first flange and the second flange for axially fixing the first flange and the second flange to the hub shell. In this case either of the flanges may be installed and removed from the hub shell very easily.

In a more specific embodiment, the outer peripheral surface of the hub shell includes axially spaced apart first and second positioning members that engage corresponding third and fourth positioning members formed on the respective first and second flanges for nonrotatably fixing the first and second flanges to the hub shell. The first, second, third and fourth positioning members are formed so that each of the first and second flanges engages the hub shell in only one circumferential position. The fixing mechanism may include first and second fixing members that threadably engage the hub shell such that sloped surfaces on the fixing members engage corresponding tapered surfaces on the first and second flanges.

DETAILED DESCRIPTION OF THE EMBODIMENTS

Figure 1:
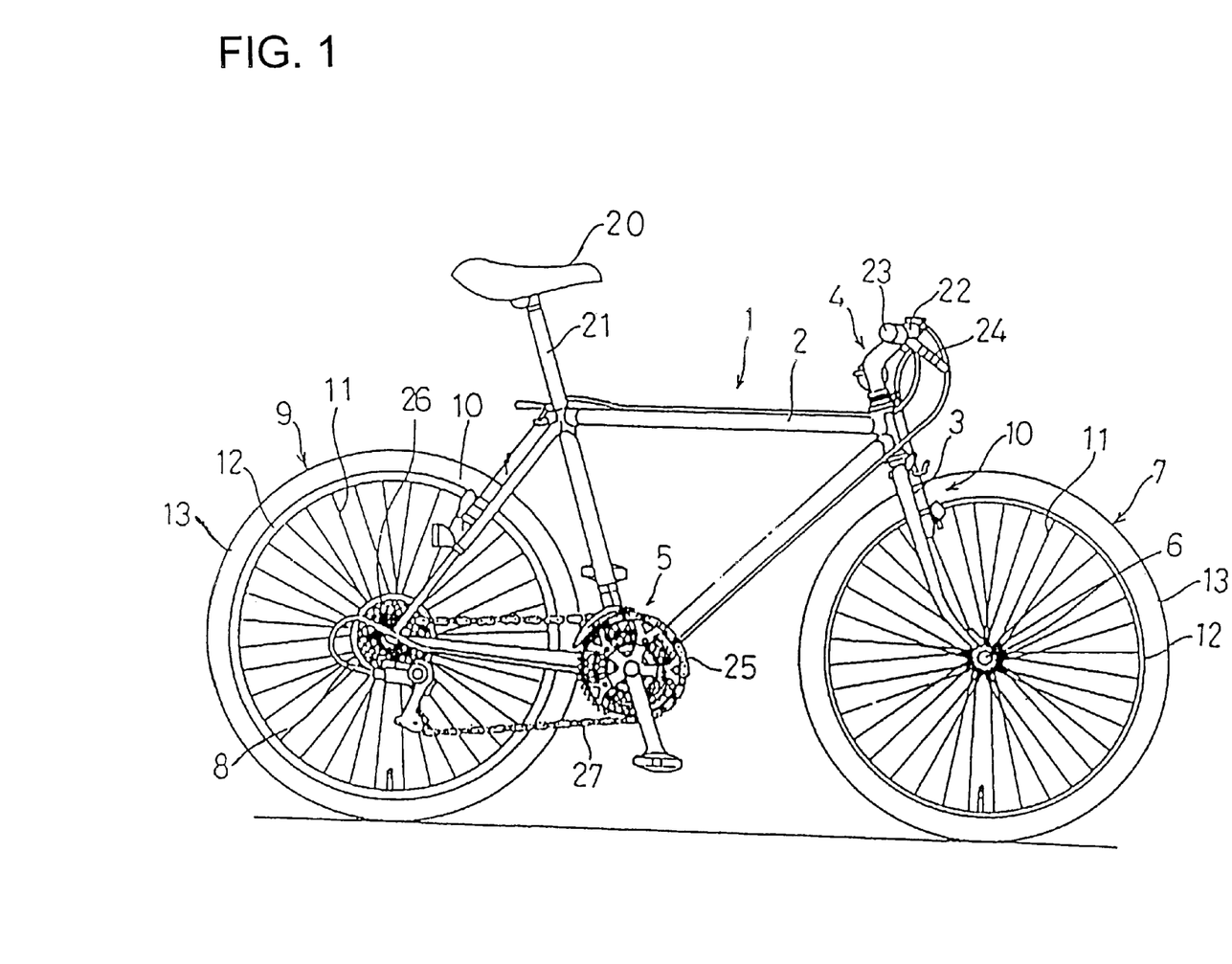
FIG. 1 is a side view of a bicycle in which a particular embodiment of a hub assembly according to the present invention has been employed.

FIG. 1 is a side view of a mountain bicycle (MTB) in which a particular embodiment of a hub assembly according to the present invention has been employed. In FIG. 1, the MTB is equipped with a diamond-shaped frame 1 which serves as the skeleton of the chassis. The frame 1 has, for example, a frame body 2 with a welded construction of metal pipes, such as aluminum alloy pipes, chrome-moly steel pipes, or titanium alloy pipes, and a front fork 3 that is rotatably supported around an inclined vertical axis by the front portion of the frame body 2 and that forks in two at its lower end. The MTB also comprises a handle component 4 that is linked to the front fork 3, a drive component 5 that is attached to the lower portion of the frame body 2 and that converts pedaling force into drive force, a front wheel 7 that has a front hub 6 attached at the lower end of the front fork 3, a rear wheel 9 that has a free hub 8 attached at the rear portion of the frame body 2, and front and rear braking devices 10. A seat tube 21 on which a saddle 20 is mounted is fixed to the frame body 2 such that it is able to move up and down. The handle component 4 has a handlebar 22. Grips 23 and brake levers 24 with attached shift levers are mounted at either end of the handlebar 22. The drive component 5 has a three-speed gear crank 25 that is rotatably supported by a bottom bracket, an eight-speed hub cog 26 mounted to the free hub 8, and a chain 27 that is wound between the gear crank 25 and the hub cog 26.

Figure 2:
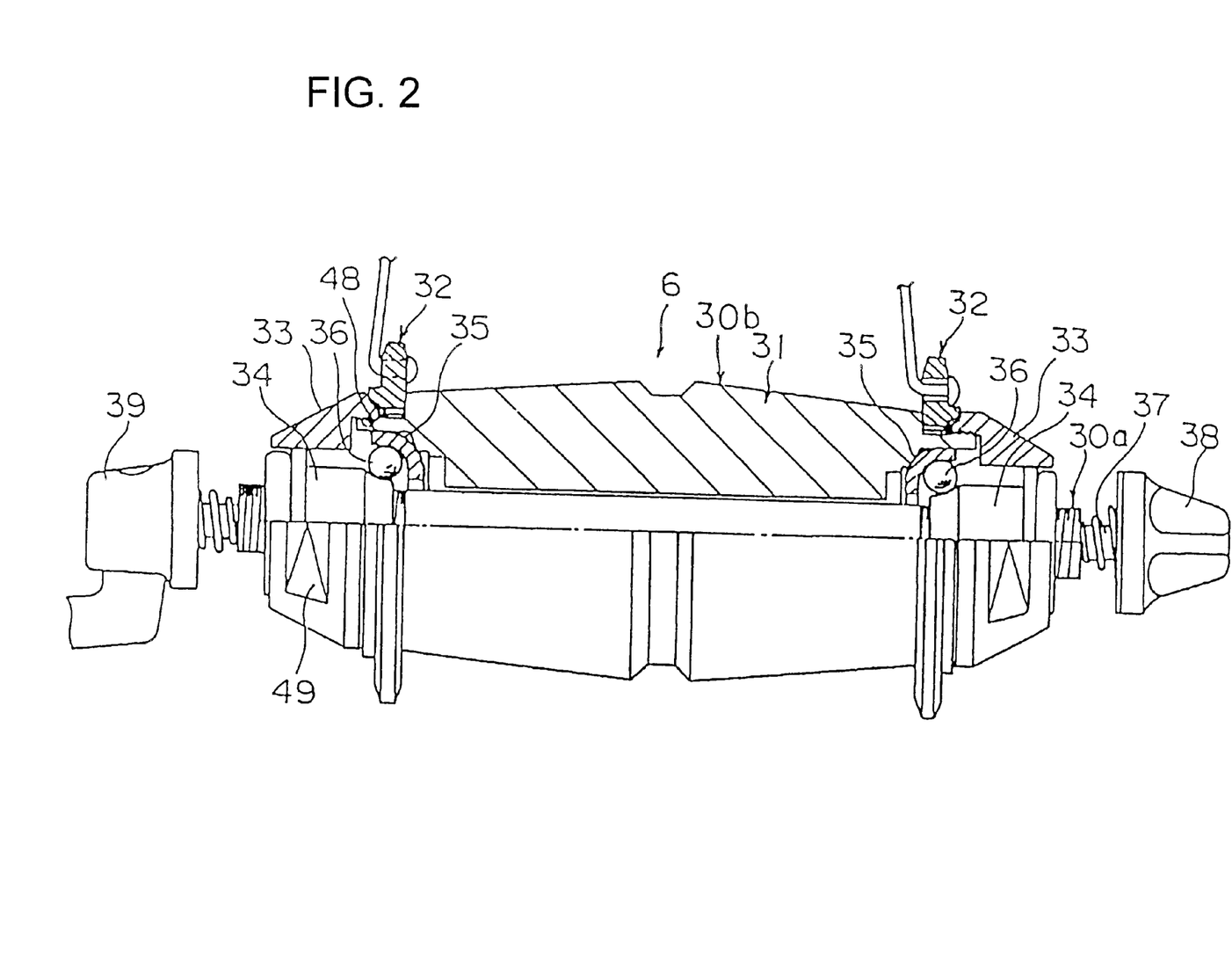
FIG. 2 is a partial cross sectional view of a front hub that employs a particular embodiment of removable spoke flanges according to the present invention.

The front wheel 7 has 36 (for example) spokes 11 that extend outward in more or less radial fashion from the front hub 6, a rim 12 into which the distal ends of the spokes 11 are threaded, and a tube tire 13 that is mounted on the rim 12. The front hub 6 is a quick-release type as shown in FIG. 2. More specifically, front hub 6 has a hollow hub axle 30a with male threads formed at both ends, and a hub shell 30b that is rotatably supported by the hub axle 30a. The hub shell 30b has a cylindrical hub unit 31 that is rotatably supported by the hub axle 30a, a pair of left and right annular flange members 32 that are removably and non-rotatably mounted around the outer periphery at both ends of the hub unit 31, and a pair of fixing caps 33 that are used to fix the pair of flange members 32 to the hub unit 31.

A pair of hub cones 34 that constitute a bearing are threaded in at both ends of the hub axle 30a. A hub cup 35 is mounted around the inner periphery at both ends of the hub unit 31, and steel balls 36 are located between the hub cones 34 and the hub cup 35. A quick-release hub rod 37 is fitted into the axial core of the hub axle 30a, and an adjusting nut 38 and a quick-release lever 39 are attached to either end of the quick hub rod 37.

Figure 3:
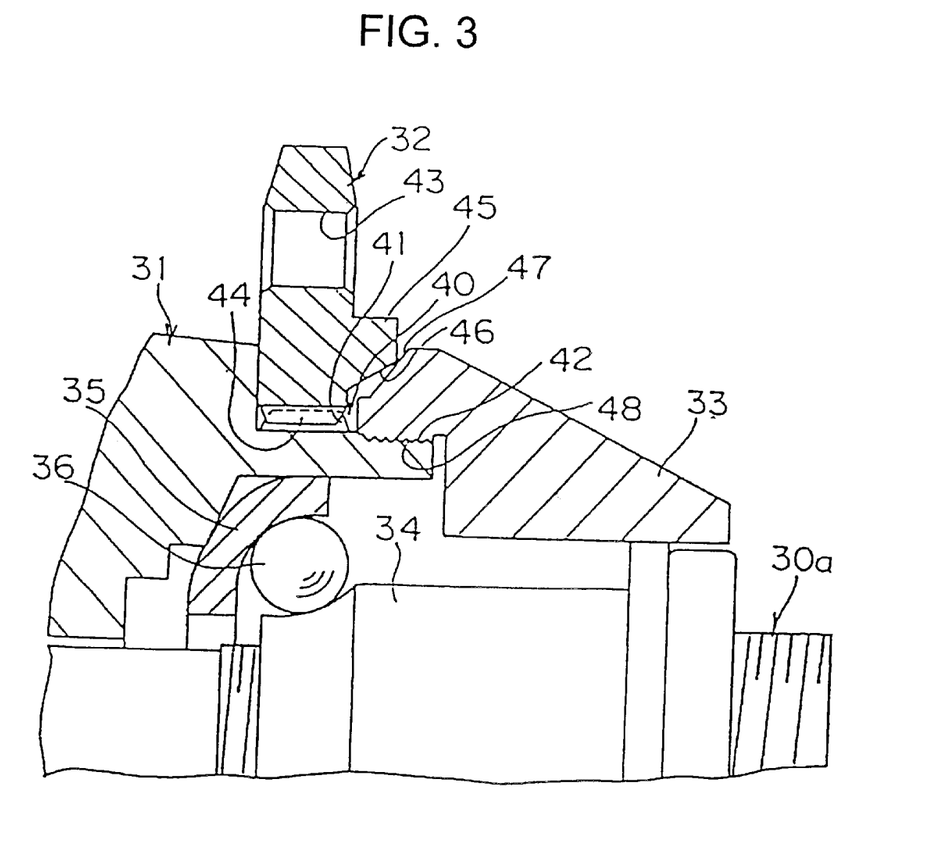
FIG. 3 is a detailed cross sectional view of the right end portion of the hub shown in FIG. 2.

As shown in FIG. 3, a small diameter stepped component 40 that has a smaller diameter than other portions of the hub unit 31 is formed around the outer periphery at both ends of the hub unit 31. Serrated outer teeth 41 are formed on the outer peripheral surface of the small diameter stepped component 40, and male threads 42 that have a smaller diameter than the serrated outer teeth 41 are formed on the outer peripheral surface of the small diameter stepped component laterally outwardly from serrated outer teeth 41. The fixing caps 33 are threaded onto these male threads 42.

Figure 4:
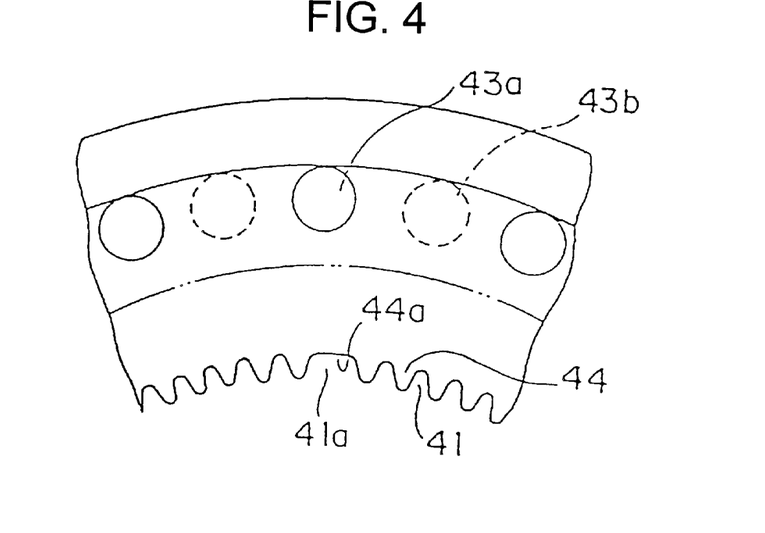
FIG. 4 is a detailed side view of a flange member.

Spoke holes 43 for mounting the spokes 11 are formed in an arbitrary number between 20 and 40, for instance, at equidistant spacing in the peripheral direction in the flange members 32, and serrated inner teeth 44 that mesh with the serrated outer teeth 41 are formed around the inner peripheral surface of flange members 32. As shown in FIG. 4, outer positioning teeth 41a that line up with specific spoke holes 43a are formed next to the serrated outer teeth 41. Inner positioning teeth 44a where an inner tooth 44 is missing are formed at portions in the proximity of the spoke holes 43a of one of the flange members 32 such that they will mesh with these outer positioning teeth 41a. These outer positioning teeth 41a and inner positioning teeth 44a are formed in a specific relation to the spoke holes 43a and 43b such that when positioning is complete, the spoke holes 43a in one of the flange members 32 will be shifted by one-half pitch from the spoke holes 43b in the other flange member 32.

An annular protrusion 45 that extends in the axial direction is formed on the outer surface of the flange members 32, and a tapered surface 46 that widens outward is formed on the inner peripheral surface of the protrusion 45. A tapered surface 47 that has a steeper slope than the tapered surface 46 is formed at the distal end of the fixing cap 33 opposite each flange member 32. Thus, when the fixing caps 33 are threaded into the hub unit 31, the tapered surfaces 47 of the fixing caps 33 come into contact with the distal end coners of the tapered surfaces 46 of the flange members 32, press the flange members 32 toward the step of the small diameter stepped component 40, and press the flange members 32 concentrically in the radial direction, so the positioning of the flange members 32 in the axial direction is simultaneous with their positioning in the radial direction.

The fixing caps 33 are shaped such that they cover the ends of the hub axle 30a, and female threads 48 that mesh with the male threads 42 are formed around the inner periphery at the ends of the fixing caps 33. A stopping component 49 (FIG. 2) that is chamfered in parallel and that is used to stop a tool (e.g., a wrench) is formed around the outer periphery of the fixing caps 33.

Figure 5:
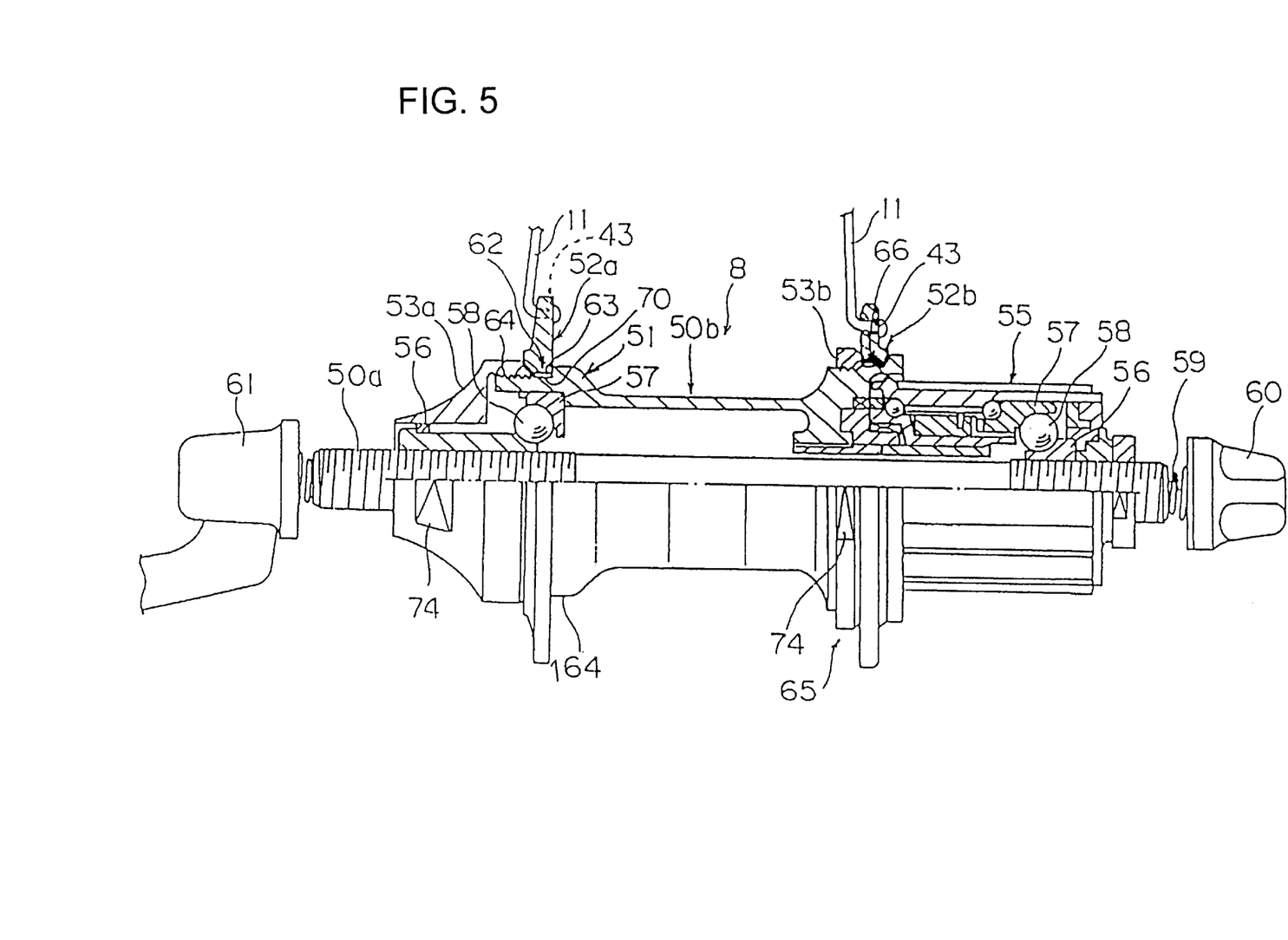
FIG. 5 is a partial cross sectional view of rear hub that employs a particular embodiment of removable spoke flanges according to the present invention.

The rear wheel 9, as shown in FIG. 1, comprises a free hub 8, 36 (for example) spokes 11 that extend outward in more or less radial fashion from the free hub 8, a rim 12 into which the distal ends of the spokes 11 are threaded, and a tube tire 13 that is mounted on the rim 12. As shown in FIG. 5, the free hub 8 is a quick-release type. More specifically, free hub 8 has a hollow hub axle 50a with male threads formed at both ends, and a hub shell 50b that is rotatably supported by the hub axle 50a. The hub shell 50b has a cylindrical hub unit 51, a pair of left and right annular flange members 52a and 52b that are removably and non-rotatably mounted around the outer periphery at either end of the hub unit 51, a fixing cap 53a that is used to fix the left flange member 52a to the hub unit 51, and a fixing nut 53b that is used to fix the right flange member 52b to the hub unit 51. The free hub 8 also has a freewheel 55 to which a hub cog is non-rotatably fixed. The freewheel 55 takes the drive force transmitted to the hub cog via the chain 27 and transmits it to the hub shell 50b in only one direction.

A pair of hub cones 56 that constitute a bearing are threaded in at both ends of the hub axle 50a. A hub cup 57 is mounted around the inner periphery at the left end of the hub unit 51 and around the inner periphery at the right end of the freewheel 55, and steel balls 58 are located between the hub cones 56 and the hub cup 57. A quick-release hub rod 59 is fitted into the axial core of the hub axle 50a, and an adjusting nut 60 and a quick-release lever 61 are attached to either end of the quick-release hub rod 59.

The center portion of the hub unit 51 is constricted into a small diameter component, with the diameter gradually increasing toward both ends. A small diameter stepped component that has a smaller diameter than the other portions is formed around the outer periphery at the left end of the hub unit 51, just as with the front hub 6. Serrated outer teeth 63 the same as in the front hub 6 are formed on the outer peripheral surface of the small diameter stepped component 62. Male threads 64 that have a smaller diameter than the serrated outer teeth 63 are formed laterally outwardly of the serrated outer teeth 63 on the small diameter stepped component 62. The fixing cap 53a is threaded onto these male threads 64.

Figure 6:
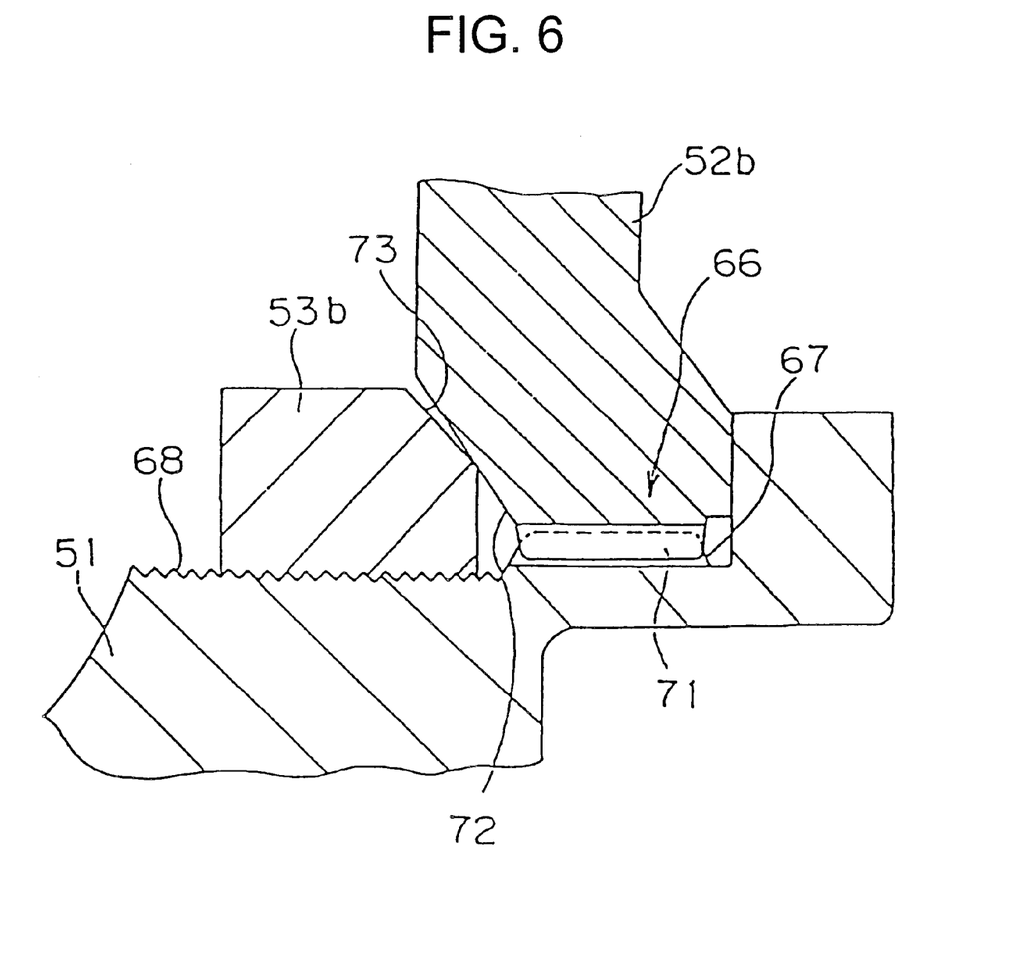
FIG. 6 is a detailed cross sectional view of the right end portion of the hub shown in FIG. 5.

The right end component 65 of the hub unit 51 has a larger diameter than the large diameter component 64 on the right side of the small diameter stepped component 62. A large diameter stepped component 66 that has an even larger diameter is formed on the end of the right end component 65. As shown in FIG. 6, serrated outer teeth 67 are formed on the outer peripheral surface of the large diameter stepped component 66. Male threads 68 that have a smaller diameter than the serrated outer teeth 67 are formed laterally inwardly of serrated outer teeth 67 on the large diameter stepped component 66.

Thirty six (for example) spoke holes 43 for mounting the spokes 11 are formed at equidistant spacing in the peripheral direction in the flange member 52a, and serrated inner teeth 70 that mesh with the serrated outer teeth 63 are formed around the inner peripheral surface of flange member 52a. The flange member 52b is an annular member that has the same outside diameter as the flange member 52a but a larger inside diameter, and serrated inner teeth 71 that mesh with the serrated outer teeth 67 are formed around the inner peripheral surface of flange member 52b. Outer positioning teeth the same as in the front hub 6 are formed for these serrated outer teeth 63 and 67, outer positioning teeth are formed for the serrated inner teeth 70 and 71, and when the flange members 52a and 52b are both mounted, the spoke holes 43 thereof are shifted by one-half pitch from one another.

An annular protrusion that extends outward and has the same tapered surface as in the front hub 6 is formed on the outer surface of the flange member 52a, and the same tapered surface as in the front hub 6 is formed at the distal end of the fixing cap 53a. As shown in FIG. 6, a tapered surface 72 that widens to the inside of the hub unit 51 is formed on the inner surface of the flange member 52b, and a tapered surface 73 that has a steeper slope than the tapered surface 72 is formed at the distal end of the fixing nut 53b opposite the flange member 52b. Thus, just as with the front hub 6, the pressing of the flange members 52a and 52b by the fixing cap 53a and the fixing nut 53b allows for simultaneous positioning of the flange members 52a and 52b with respect to the hub unit 51 in the axial direction and in the radial direction. A stopping component 74 (FIG. 5) that is chamfered in parallel and used to stop a tool (wrench) is formed around the outer periphery of the fixing cap 53a and the fixing nut 53b.

The procedure for replacing the flange members will now be described. When a change from 36 spokes to 28 spokes is to be made, for example, front and rear pairs of flange members 32 and of 52a and 52b in which 28 spoke holes have been formed are readied along with front and rear rims. Inner positioning teeth 44a are formed around the inner periphery of each pair of flange members so that the spoke holes 43 will be shifted by one-half pitch from one another. The shape and number of the serrated inner teeth and outer teeth are the same for the 28-spoke flange members and the 36-spoke flange members.

First, the tires 13 and tubes are removed from the front and rear wheels 7 and 9, the spokes 11 are removed from the rim 12, and the front hub 6 and the free hub 8 are taken out. Next, the fixing caps 33 and 53a and the fixing nut 53b are loosened with a wrench, and the flange members 32, 52a, and 52b in which 36 spoke holes are formed are removed from the hub units 31 and 51.

In the assembly of the front hub 6, the front flange members 32 that have been readied with 28 spoke holes are mounted from both ends of the hub unit 31 of the front hub 6. At this point, because the outer positioning teeth 41a and the inner positioning teeth 44a are formed such that the opposing spoke holes 43 are shifted by one-half pitch, the disposition of the opposing spoke holes 43 is shifted by one-half pitch merely by the mounting of the flange members 32. When the flange members 32 are mounted, the fixing caps 33 are screwed in from both ends to fix the flange members 32. At this point, contact between the tapered surfaces allows simultaneous positioning in the radial direction and the axial direction, as discussed above.

In the assembly of the free hub 8, the flange member 52b is mounted from the left side. The fixing nut 53b is then also mounted from the left side, and screwed in to fix the flange member 52b. Next, the flange member 52a is mounted from the left side of the free hub 8, and the fixing cap 53a is also mounted and screwed in from the left side to fix the flange member 52a. Here again, the spoke holes 43 are similarly disposed such that they are shifted by one-half pitch, and positioning in the radial and axial directions can be performed simultaneously.

Once the front hub 6 and the free hub 8 have been put together, 28 of the spokes 11 are installed in each hub, and the spokes 11 are attached to the rim 12 in a 6–3 intersecting pattern to assemble the front wheel 7 and rear wheel 9. Finally, run-out adjustment and centering are performed, after which the tires 13 and tubes are mounted to complete the front wheel 7 and rear wheel 9.

Since wheels with different spoke holes can be assembled merely by readying rims and flange members, common hubs can be used as much as possible regardless of the number of spokes involved. Also, if a spoke hole should be damaged, the hub unit and hub axle can still be reused merely by replacing the flange member on the damaged side. Accordingly, the user is subjected to less of a financial burden to replace the hub.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. The means for shifting the spoke holes by one-half pitch is not limited to outer and inner positioning teeth, and may instead be a means that features other male-female fitting. The means for non-rotatably joining the flange members to the hub unit is not limited to serration joining, and may instead be key joining, spline joining, or another joining means. The hub is not limited to one that is linked to the rim by spokes, and a so-called Tenshoku Disk (trade name), which makes use of aramid fiber yarns instead of spokes, or a hub that makes use of another linking member can also be applied to the present invention. Thus, the scope of the invention should not be limited by the specific structures disclosed. Instead, the true scope of the invention should be determined by the following claims.

What is claimed is:

1. A bicycle hub apparatus comprising:
   a hub shell for rotating coaxially around a hub axis, wherein the hub shell has a threaded outer peripheral surface;
   a flange; and
   a threaded fixing member for engaging the threaded outer peripheral surface of the hub shell and for producing a force against a side surface of the flange in a direction of the hub axis for fixing the flange to the hub shell.

2. The apparatus according to claim 1 wherein the outer peripheral surface of the hub shell includes a first positioning member that engages a second positioning member formed on the flange for nonrotatably fixing the flange to the hub shell.

3. The apparatus according to claim 2 wherein the first positioning member and the second positioning member are formed so that the flange engages the hub shell in only one circumferential position.

4. The apparatus according to claim 1 wherein the outer peripheral surface of the hub shell includes a plurality of first teeth that engage a corresponding plurality of second teeth formed on an inner peripheral surface of the flange for nonrotatably fixing the flange to the hub shell.

5. A bicycle hub apparatus comprising:
   a hub shell having a threaded outer peripheral surface;
   a flange;
   a threaded fixing member for engaging the threaded outer peripheral surface of the hub shell and for fixing the flange to the hub shell;
   wherein the outer peripheral surface of the hub shell includes a plurality of first teeth that engage a corresponding plurality of second teeth formed on an inner peripheral surface of the flange for nonrotatably fixing the flange to the hub shell; and
   wherein at least one of the plurality of first teeth and the plurality of second teeth includes a positioning tooth shaped differently from other ones of the plurality of first teeth and the plurality of second teeth so that the flange engages the hub shell in only one circumferential position.

6. A bicycle hub apparatus comprising:
   a hub shell having a threaded outer peripheral surface;

a flange; and a threaded fixing member for engaging the threaded outer peripheral surface of the hub shell and for fixing the flange to the hub shell;

wherein the fixing member includes a first tapered surface that engages a second tapered surface on the flange for pressing the flange radially outwardly.

7. The apparatus according to claim 6 wherein the first tapered surface has a different slope than the second tapered surface.

8. The apparatus according to claim 7 wherein the first tapered surface is steeper than the second tapered surface.

9. The apparatus according to claim 6 wherein the first tapered surface applies a force to the second tapered surface in an axial direction of the hub shell.

10. The apparatus according to claim 1 wherein the fixing member has a stopping component for engaging a wrench.

11. The apparatus according to claim 1 wherein the fixing member has a cap shape.

12. The apparatus according to claim 1 wherein the flange includes a plurality of holes spaced apart in the circumferential direction.

13. A bicycle hub apparatus comprising:

a hub shell for rotating coaxially around a hub axis;

a first flange;

a second flange; and a fixing mechanism formed separately from the hub shell, the first flange and the second flange for axially fixing the first flange and the second flange to the hub shell by producing pressing forces against a side surface of the first flange and a side surface of the second flange in a direction of the hub axis.

14. The apparatus according to claim 13 wherein the outer peripheral surface of the hub shell includes axially spaced apart first and second positioning members that engage corresponding third and fourth positioning members formed on the respective first and second flanges for nonrotatably fixing the first and second flanges to the hub shell.

15. The apparatus according to claim 14 wherein the first, second, third and fourth positioning members are formed so that each of the first and second flanges engages the hub shell in only one circumferential position.

16. The apparatus according to claim 15 wherein the first flange includes a plurality of first holes evenly spaced apart in the circumferential direction, wherein the second flange includes a plurality of second holes evenly spaced apart in the circumferential direction, and wherein the plurality of first holes are offset by one half pitch from the plurality of second holes in the circumferential direction when the first and second flanges are fixed to the hub shell.

17. The apparatus according to claim 13 wherein the outer peripheral surface of the hub shell includes a plurality of circumferentially extending first teeth axially spaced apart from a plurality of circumferentially extending second teeth, wherein an inner peripheral surface of the first flange includes a plurality of third teeth that engage the plurality of first teeth on the hub shell for nonrotatably fixing the first flange to the hub shell, and wherein an inner peripheral surface of the second flange includes a plurality of fourth teeth that engage the plurality of second teeth on the hub shell for nonrotatably fixing the second flange to the hub shell.

18. A bicycle hub apparatus comprising:

a hub shell;

wherein the outer peripheral surface of the hub shell includes a plurality of circumferentially extending first teeth axially spaced apart from a plurality of circumferentially extending second teeth;

a first flange;

wherein an inner peripheral surface of the first flange includes a plurality of third teeth that engage the plurality of first teeth on the hub shell for nonrotatably fixing the first flange to the hub shell;

a second flange;

wherein an inner peripheral surface of the second flange includes a plurality of fourth teeth that engage the plurality of second teeth on the hub shell for nonrotatably fixing the second flange to the hub shell;

a fixing mechanism formed separately from the hub shell, the first flange and the second flange for axially fixing the first flange and the second flange to the hub shell;

wherein at least one of the plurality of first teeth and the plurality of third teeth includes a first positioning tooth shaped differently from other ones of the plurality of first teeth and the plurality of third teeth so that the first flange engages the hub shell in only one circumferential position, and wherein at least one of the plurality of second teeth and the plurality of fourth teeth includes a second positioning tooth shaped differently from other ones of the plurality of second teeth and the plurality of fourth teeth so that the second flange engages the hub shell in only one circumferential position.

19. The apparatus according to claim 18 wherein the first flange includes a plurality of first holes evenly spaced apart in the circumferential direction, wherein the second flange includes a plurality of second holes evenly spaced apart in the circumferential direction, and wherein the plurality of first holes are offset by one half pitch from the plurality of second holes in the circumferential direction when the first and second flanges are fixed to the hub shell.

20. The apparatus according to claim 13 wherein the fixing mechanism includes a separate first fixing member for fixing the first flange to the hub shell.

21. A bicycle hub apparatus comprising:

a hub shell;

a first flange;

a second flange;

a fixing mechanism formed separately from the hub shell, the first flange and the second flange for axially fixing the first flange and the second flange to the hub shell;

wherein the fixing mechanism includes a separate first fixing member for fixing the first flange to the hub shell; and wherein the first fixing member includes a first tapered surface that engages a second tapered surface on the first flange for pressing the first flange radially outwardly.

22. The apparatus according to claim 21 wherein the first tapered surface has a different slope than the second tapered surface.

23. The apparatus according to claim 22 wherein the first tapered surface is steeper than the second tapered surface.

24. The apparatus according to claim 21 wherein the first tapered surface applies a force to the second tapered surface in an axial direction of the hub shell.

25. The apparatus according to claim 20 wherein the first fixing member has a stopping component for engaging a wrench.

26. The apparatus according to claim 20 wherein the first fixing member has a cap shape.

27. The apparatus according to claim 20 wherein the fixing mechanism includes a separate second fixing member for fixing the second flange to the hub shell.

28. A bicycle hub apparatus comprising:

a hub shell;

a first flange;

a second flange;

a fixing mechanism formed separately from the hub shell, the first flange and the second flange for axially fixing the first flange and the second flange to the hub shell;

wherein the fixing mechanism includes a separate first fixing member for fixing the first flange to the hub shell;

wherein the fixing mechanism includes a separate second fixing member for fixing the second flange to the hub shell;

wherein the first fixing member includes a first tapered surface that engages a second tapered surface on the first flange for pressing the first flange radially outwardly, and wherein the second fixing member includes a third tapered surface that engages a fourth tapered surface on the second flange for pressing the second flange radially outwardly.

29. The apparatus according to claim 28 wherein the first tapered surface has a different slope than the second tapered surface, and wherein the third tapered surface has a different slope than the fourth tapered surface.

30. The apparatus according to claim 29 wherein the first tapered surface is steeper than the second tapered surface, and wherein the third tapered surface is steeper than the fourth tapered surface.

31. The apparatus according to claim 28 wherein the first tapered surface applies a force to the second tapered surface in a first axial direction of the hub shell, and wherein the third tapered surface applies a force to the fourth tapered surface in a second axial direction of the hub shell.

32. The apparatus according to claim 31 wherein the first axial direction is the same as the second axial direction.

33. The apparatus according to claim 31 wherein the first axial direction is opposite the second axial direction.

34. The apparatus according to claim 27 wherein the first fixing member has a first stopping component for engaging a wrench, and wherein the second fixing member has a second stopping component for engaging the wrench.

35. The apparatus according to claim 27 wherein the first fixing member has a cap shape, and wherein the second fixing member has a cap shape.

36. The apparatus according to claim 27 wherein the outer peripheral surface of the hub shell includes axially spaced apart first and second threaded portions that engage corresponding threaded portions of the first and second fixing members.

37. The apparatus according to claim 13 wherein the first flange includes a plurality of first holes spaced apart in the circumferential direction, and wherein the second flange includes a plurality of second holes spaced apart in the circumferential direction.

38. A bicycle hub apparatus comprising:

a hub shell for rotating coaxially around a hub axis, wherein the hub shell has a threaded outer peripheral surface;

a flange;

a threaded fixing member for engaging the threaded outer peripheral surface of the hub shell and for producing a force against the flange in a direction of the hub axis for fixing the flange to the hub shell; and wherein the fixing member presses against a side surface of the flange.

39. A bicycle hub apparatus comprising:

a hub shell for rotating coaxially around a hub axis;

a first flange;

a second flange; and a fixing mechanism formed separately from the hub shell, the first flange and the second flange for axially fixing the first flange and the second flange to the hub shell by producing pressing forces against the first flange and the second flange in a direction of the hub axis; and wherein the fixing mechanism includes:

a first fixing member that presses against a side surface of the first flange, and a second fixing member that presses against a side surface of the second flange.

* * * * *